US009811871B2

(12) United States Patent
Humphries (10) Patent No.: US 9,811,871 B2
(45) Date of Patent: Nov. 7, 2017

(54) SYSTEM AND METHOD OF WATERMARKING

(71) Applicant: Sony Interactive Entertainment Europe Limited, London (GB)

(72) Inventor: Stephen Andrew Humphries, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 14/880,606

(22) Filed: Oct. 12, 2015

(65) Prior Publication Data
US 2016/0110838 A1 Apr. 21, 2016

(30) Foreign Application Priority Data

Oct. 21, 2014 (GB) .................................. 1418712.4

(51) Int. Cl.
*G06K 9/00* (2006.01)
*G06T 1/00* (2006.01)

(52) U.S. Cl.
CPC ............ *G06T 1/005* (2013.01); *G06T 1/0028* (2013.01); *G06T 2201/0051* (2013.01)

(58) Field of Classification Search
None
See application file for complete search history.

(56) References Cited

U.S. PATENT DOCUMENTS 5,710,878 A * 1/1998 McCoy ................... G06T 17/00
345/419
6,633,652 B1 * 10/2003 Donescu ............... G06T 1/0042
375/E7.089

(Continued)

FOREIGN PATENT DOCUMENTS

EP 2426612 A1 3/2012

OTHER PUBLICATIONS

Anton Mosunov et al: "Assured Supraliminal Steganography in Computer Games" In: "Correct System Design", Mar. 8, 2014 (Mar. 8, 2014). Springer International Publishing. Cham 032548, XP055248209, ISSN: 0302-9743, ISBN: 978-3-642-14798-2, vol. 8267. pp. 245-259. DOI: 10.1007/978-3-319-05149-9 16, *p. 246. line 6—p. 247, line 8 p. 248. line 26—p. 251. line 2 p. 252. line 1—p. 254. line 6*.

(Continued)

Primary Examiner — Nancy Bitar
(74) Attorney, Agent, or Firm — Lerner, David, Littenberg, Krumholz & Mentlik, LLP (57) ABSTRACT

A method of watermarking video images of a particular instance of a virtual environment is provided. The method includes selecting a plurality of virtual objects for inclusion within the virtual environment and respectively altering a physical property of the selected virtual objects from a reference value to a respective different value. The respective different value is selected responsive to respective identification values of identification data associated with that particular instance of the virtual environment. The physical property has a visible effect on the appearance of the virtual objects. The method further includes rendering, for display, the virtual environment comprising the altered virtual objects.

15 Claims, 4 Drawing Sheets

(56) References Cited

U.S. PATENT DOCUMENTS

| | | | |
|---|---|---|---|
| 8,750,598 B2 * | 6/2014 | Bonner | G06F 17/50 345/419 |
| 8,788,952 B2 * | 7/2014 | Hamilton, II | A63F 13/79 715/706 |
| 9,007,362 B2 * | 4/2015 | Shuster | G06T 15/20 345/419 |
| 9,202,064 B2 * | 12/2015 | Diehl | G06F 21/60 |
| 2009/0070075 A1 | 3/2009 | Funk | |
| 2010/0203968 A1 * | 8/2010 | Gill | H04L 67/38 463/32 |
| 2011/0055733 A1 * | 3/2011 | Hamilton, II | A63F 13/85 715/757 |
| 2015/0095882 A1 * | 4/2015 | Jaeger | G06F 8/34 717/109 |

OTHER PUBLICATIONS

Paul S Cerkez et al: "Do you see what I see? A presentation to the 2014 Cyber Crime Conference", Apr. 30, 2014 (Apr. 30, 2014). XP055248008, Retrieved from the Internet: URL:http://www.usacybercrime.comjpaperclip/speakermanagement/14CC/presentation filedistribution/39/b93a504f26b50f31a587f6183 91238a55dfbb705.pdf [retrieved on Feb. 5, 2016] *p. 3-p. 13 * * p. 23-p. 25*.

Shirali-Shahreza M et al: "Collage Steganography", Computer and Information Science. 2006, ICIS-COMSAR 2006. 5th IEEE/ACI S International Conference on Honolulu, HI, USA Jul. 10-12, 2006, Piscataway, NJ, USA, IEEE, Jul. 10, 2006 (Jul. 10, 2006), pp. 316-321, XP010928892, DOI: 10.1109/ICIS-COMSAR.2006.27 ISBN: 978-0-7695-2613-3 * abstract * * p. 318. paragraph 3—p. 319.

Sebastian Zander et al: "Covert channels in multiplayer first person shooter online games", 33rd IEEE Conference on Local Computer Networks (LCN 2008)—Oct. 14-17, 2008—Montreal, Que. Canada. IEEE, Piscataway, NJ. USA, Oct. 14, 2008 (Oct. 14, 2008). pp. 215-222. XP031355848, ISBN: 978-1-4244-2412-2 *p. 215. left-hand column. line 21—right-hand column, last line * p. 217. paragraph III—p. 218, left-hand column. line 17*.

Waldemar Berchtold et al: Proceedings of SPIE. "Video game watermarking", vol. 8665. Feb. 21, 2013 (Feb. 21, 2013), p. 866506. XP055247591, US ISSN: 0277-786X. DOI: 10.1117/12.2005851 ISBN: 978-1-62841-730-2, * abstract * * p. 10. paragraph 6—p. 12, paragraph 6.4.

Extended European Search Report for Application No. 15188194.3, dated Feb. 18, 2016.

Combined Search and Examination Report under Sections 17 and 18(3) for Application No. GB1418712.4 dated Apr. 1, 2015, 6 pages.

* cited by examiner

SYSTEM AND METHOD OF WATERMARKING

CROSS REFERENCE TO RELATED APPLICATIONS

The present application claims the benefit of and priority to GB Application No. 1418712.4 filed Oct. 21, 2014, the entire disclosure of which is incorporated by reference herein.

BACKGROUND OF THE INVENTION

1. Field of the Invention

The present invention relates to a system and method of watermarking.

2. Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Digital media has the inherent feature that perfect duplicates can be made of it; this is useful when generating legitimate copies of the media for download or inclusion on a disk, but is obviously problematic when people generate and distribute unauthorised copies in so-called 'piracy'.

There are numerous ways to combat piracy, some of which can place an undue burden on legitimate end-users of the media. However the inclusion of identification data that corresponds to specific instances of the digital media can be useful, in particular where the specific instance of the digital media can in turn be traced back to an individual.

The accountability of the individual has a chilling effect on the creation of unauthorised copies by those individuals, thereby reducing supply. In addition, where the media is validated by a secure online service, as is possible with video games, then knowing which specific instances of the digital media have been pirated can allow for unauthorised copies and their users to be identified by the secure online service. Again this can have a chilling effect, this time on demand for the unauthorised copies.

In pre-recorded media such as films, the identification data has taken the form of watermarks. Often these watermarks are concealed within the video image using steganography. Pirates have attempted to undermine such watermarking by a variety of techniques aimed at scrambling identification of the specific instance of the digital media, and in response watermarking techniques have become increasingly sophisticated and robust. However these robust techniques are generally based on having a predefined sequence of images to work with.

Meanwhile in videogames, traditionally the identification data is part of the program code and is validated by a secure online service, and hence there has been little need for visible watermarking to identify the source instance of a pirate copy.

However with the advent of social media and the prevalence of video capture of videogames on services such as YouTube® and Twitch®, the need to identify videogames using only the resulting video image, without access to the program code, has grown. This is particularly acute where review copies of games are distributed under conditions of confidence before general release of a game, but then footage of the game is leaked to the public in breach of that confidence. Again it will be desirable to bring individuals to account, or in the case of piracy to trace and/or disable the corresponding instance of the videogame being shown.

However it will be appreciated that in many videogames the generated imagery being shown is entirely dependent on the user's gameplay, making the inclusion of discrete and robust watermarks of the kind used in conventional pre-recorded media much more difficult.

The present invention aims to alleviate or mitigate this problem.

SUMMARY OF THE INVENTION

In a first aspect, a method of watermarking video images of a particular instance of a virtual environment is provided in accordance with claim 1.

In another aspect, an entertainment device is provided in accordance with claim 13.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, a system and method of watermarking are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Embodiments of the present invention are applicable to videogames and virtual environments implemented on suitable devices such as domestic and handheld videogame consoles, smart phones, tablets, laptops and personal computers, as well as other devices capable of accessing videogames via streaming services, such as mobile phones and smart TVs.

Figure 1:
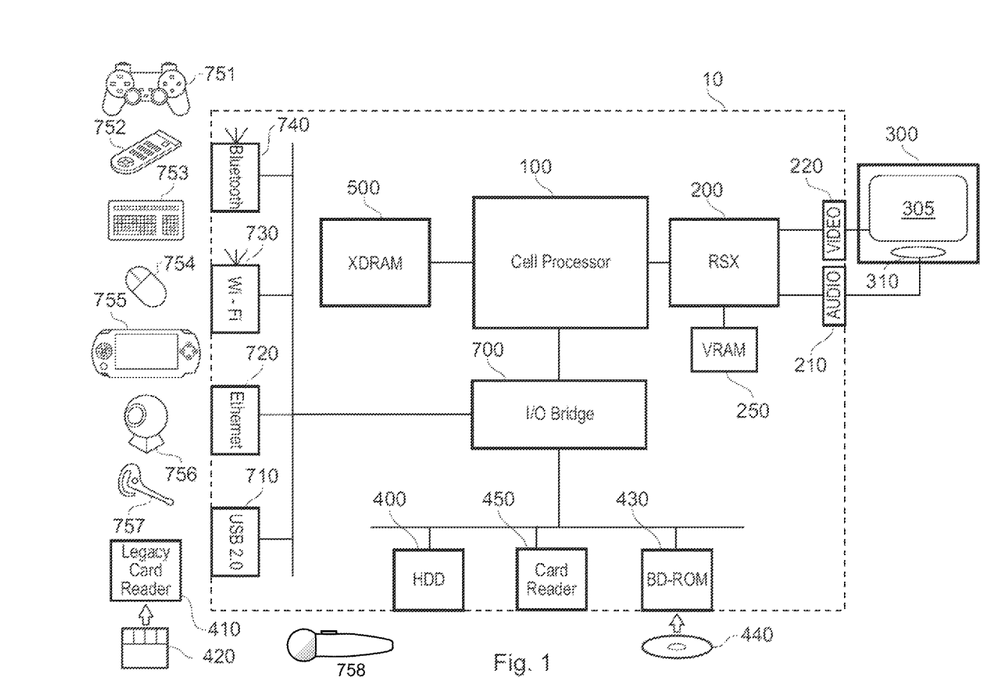
FIG. 1 is a schematic diagram of an entertainment device.

Referring now to FIG. 1, an example of a common domestic videogame console is the Sony® PlayStation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi®) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move®758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio® CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI®) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Software instructions implemented by the Cell processor 100 and/or the RSX® 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the PlayStation 3 device's operating system (OS). In operation, the OS provides a user interface enabling a user to select from a variety of functions, including playing a game, listening to music, viewing photographs, or viewing a video. The interface takes the form of a so-called cross media-bar (XMB®), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the PlayStation 3 device may select appropriate options automatically (for example, by commencing the game), or may provide relevant options (for example, to select between playing an audio disk or compressing its content to the HDD 400).

It will be appreciated that the PlayStation 3 is merely one example of a videogame console; current examples include the PlayStation 4®, the PlayStation Vita®, the Xbox 360®, the Xbox One®, the Nintendo Wii U®, and the Nintendo 2DS®, 3DS® and their variants.

Figure 2:
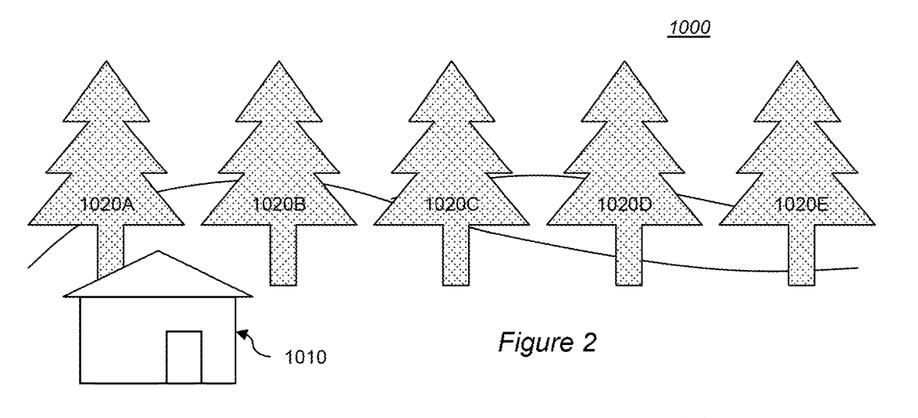
FIG. 2 is a schematic diagram of a virtual environment.

Turning now to FIG. 2, a notional scene from a videogame depicts environmental features consistent with the particular videogame. These environmental features are typically 3D models within a virtual environment 1000 generated and maintained by the entertainment device. In FIG. 2 the virtual environment comprises models of a cottage 1010 and trees 1020 A-E, but may equally comprise spaceships, vehicles, buildings, platforms, creatures, racetracks, stadium crowds, barrels or the like.

In an embodiment of the present invention, identification data is visibly integrated within the videogame by changing physical properties of a set of objects within the virtual environment, the changes in physical properties representing the identification data.

FIG. 2 a represents an example reference version of a scene within the videogame in which no identification data has been integrated; in this version it can be seen that all the trees within the virtual environment are of equal type, with equal height, equal spacing and equal colour (represented by the same hatching pattern in the figure), and are equally positioned along a notional line on the ground.

In an embodiment of the present invention, one or more of these features may be changed in response to unique identification data associated with a specific instance of the videogame. The unique identification data may comprise (or may be expressed as) a binary sequence. Hence the entertainment device, as will be explained below, uses this binary sequence to control the selection of one or more physical properties associated with each of these objects.

Figure 3A:
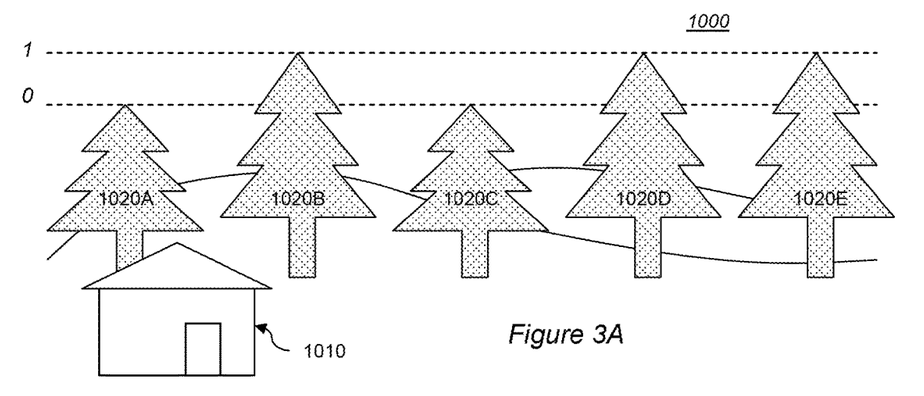
FIG. 3A is a schematic diagram of a virtual environment in accordance with embodiments of the present invention.

Referring now to FIG. 3A, the models of the trees within the virtual environment have had their height modified to reflect a binary sequence, where tall trees correspond to '1' and short trees correspond to '0'. The tree height may be varied by selection of two tree models of different heights, or by changing parameter values to change the vertical scale of the same tree model, or where the tree is procedurally generated, changing parameter values to generate trees at the two desired heights as applicable.

In FIG. 3A, the trees thus encode the binary sequence 01011 when read from left to right in this figure.

Figure 3B:
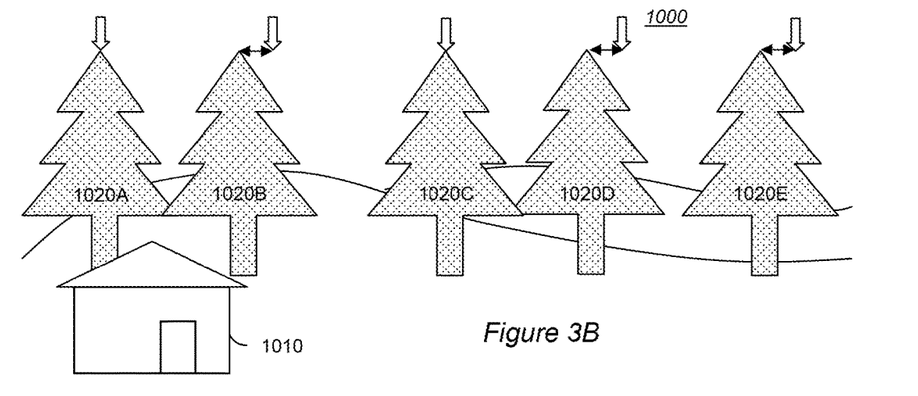
FIG. 3B is a schematic diagram of a virtual environment in accordance with embodiments of the present invention.

Referring now to FIG. 3B, in another example the placement of trees within the virtual environment has been modified along a notional x-axis to reflect the binary sequence. In this example, a default regular spacing is indicated by the arrows, but where trees are offset to the left of the reference position then they correspond to '1', whilst trees that have not been offset from the reference position correspond to '0'.

In FIG. 3B, the trees thus again encode the binary sequence 01011 when read from left to right in this figure. Clearly other offset schemes can be considered such as trees being offset to the right to correspond to either '1' or '0' as desired.

It will be appreciated that the placement of the trees could similarly be modified by an offset on the notional z-axis, so that movement either forwards or backwards from the reference or default position indicates a '1' or '0' as desired.

The offset placement of virtual objects to encode binary data need not be limited to fixed positive or negative values in the x, y or z directions from a default position, however. For example, the objects may directly encode bit positions or values in an array of data. In this example, the position of birds in a flock on a roof, or the initial position of people in a town square, or a pattern of damage to bath tiles, etc., can encode N×M bits of data directly, where N and M denote how the roof/square/wall or region are partitioned for the purpose. Similarly the co-ordinates of a sequence of objects within such regions can encode values up to (N, M). Hence for example a 10×10 flagstone square with five people in it can encode 10 numbers, each from 0-9 or 1-10. It will be appreciated that the same identification data can be presented in one or more of these ways within the same virtual environment.

Alternatively or in addition to displacing an object, it may be rotated to signify identification values. For example, a non-player character may face north or south to indicate binary '1' or '0'. It will be appreciated that a higher bit density may be provided by further subdividing the rotation; for example selecting one of the four compass points can indicate two bits of data. A change in rotation (orientation) can be made with respect to an absolute reference direction or with respect to an arbitrary default direction for that object. It will be understood that whilst most objects may only rotate about the 'y' axis, alternatively or in addition an object may rotate about the x or z axis (for example in the case of a boulder on the ground or a ship in space, where the user will not have a preconceived notion of the 'correct' orientation).

Figure 3C:
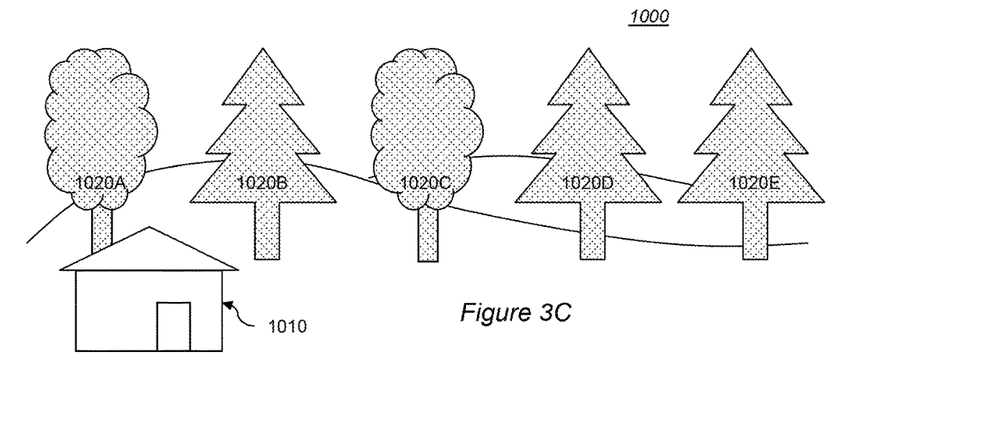
FIG. 3C is a schematic diagram of a virtual environment in accordance with embodiments of the present invention.

Referring now to FIG. 3C, in another example different types of tree model are used within the virtual environment to encode the binary sequence. In this example, the reference tree model represents '1', and a different style of tree model is used to represent '0'. Hence again the trees encode the binary sequence 01011 when read from left to right in the figure.

Alternatively, trees representing '1' or '0' (as desired) could simply be omitted from the environment, thus encoding the binary data based on an object presence/absence scheme. However, in this case where by chance the identification values comprise a predominance of values indicated by omitting an object, then the environment may look sparse.

Finally it will be appreciated that physical properties other than structural properties can be used, such as different colours; for example light green representing '1' and dark green representing '0'. However colour can be more difficult to resolve in a captured video clip of a game, particularly where the game employs environmental effects such as weather, a day/night sequence, or in-game light sources that can add additional and potentially non-uniform colouring to the rendered image of the virtual environment. Nevertheless some virtual objects may reasonably encompass sufficiently large colour variations that these environmental effects can be overcome; for example light and dark colour sequences in bricks or paving stones may be used.

A further consideration with variation on the basis of colour is that providing duplicate textures of different colours can be memory intensive; furthermore many videogames enable the loading of modified texture packs, for example to customise the appearance of some or all aspects of the game; such texture packs could accidentally or deliberately remove the colour differentiation provided in the original duplicate textures.

To address this, a game can apply a tint to the/each texture for an object according to whether or not that object is selected to be a '1' object or a '0' object. Such a tint thus acts independently of the texture provided to the game to create colour variation to encode the identification data, but is still subject to the problem of variations in lighting mentioned previously.

It will be appreciated that more than one modification to a reference model of an object can be used at the same time to increase the number of bits encoded in a sequence of objects placed within the virtual environment.

Figure 4:
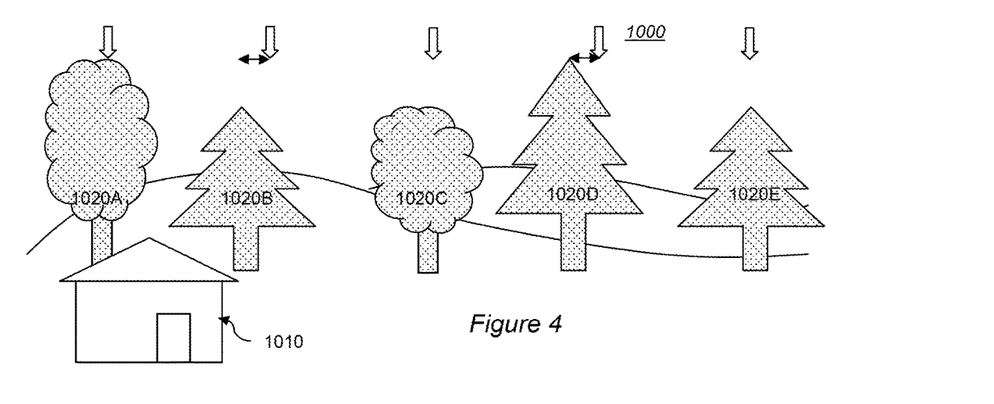
FIG. 4 is a schematic diagram of a virtual environment in accordance with embodiments of the present invention.

Hence in FIG. 4, the trees have been modified from the reference pattern in three different ways; by variation in type, by variation in height, and by variation in lateral placement. These three modifications respectively give rise to the binary patterns 01011, 10010 and 01010 when read from left to right in the Figure. It will be appreciated that further modifications could also be included to the same sequence of objects, such as z-axis displacement, colour variation, and rotation (e.g. leaning left or right), resulting in that case in a total of 30 bits of information from the five trees.

How these binary patterns combine (for example whether they concatenate in sequence or are interleaved on a per-tree basis) can be a decision for the designer of the game.

It will further be appreciated that, in the above example of a sequence of trees, these trees may be part of a much larger group of trees, making their use as an indicator of identification data more discreet. This not only makes it more difficult for a malicious user of the game to attempt to identify and avoid displaying the trees, but it also helps to maintain a sense of natural immersion for legitimate players of the game.

Further steps to make the binary encoding of identification data by modification of structural features of the environment discreet can include classifying the '1' and '0' values within ranges, so that for example the sequence of trees are not all exactly one of two heights, but can appear to vary more naturally within height ranges respectively corresponding to binary '1' and '0'.

Similarly in height sequences there is no need for all the trees in a sequence to be the same kind; different varieties of tree may be provided in the sequence where each type of tree has its own respective '1' and '0' height or height range, so that to the casual observer the tree height across sequence appears random.

Meanwhile where tree types themselves are used to encode binary sequences, if there are more than two types of tree modelled (for example four types of tree), then multiple varieties can be assigned to at least one of binary '1' and '0' so that the sequence appears more natural within the virtual environment.

Finally, although it is not essential, a known reference object may be positioned in a known relationship to the embedded sequence so that an investigator can easily identify the start position of a sequence hidden within the environment of the videogame; in the above example, the cottage 1010 acts as such a known reference object and is positioned in front of the first tree 1020A within the sequence.

It will be appreciated that the reference placement of trees does not need to be in a straight line as shown in the figures, but could be any distribution within an area of the virtual environment that the user may encounter; as long as the intended readout order of the trees is known to an investigator, the reference placement within the environment can be arbitrary.

Consequently it also follows that it is not necessary for all the objects in a sequence to be visible at the same time; for example, in a similar manner to off-setting the trees as described above, varying the distance between burning torches placed along a meandering corridor may be used to encode a binary sequence even though only one or two torches are visible at any one time; nevertheless a video of a user navigating this corridor will still reveal the sequence to an investigator.

Appreciating that not all elements of the physical sequence need to be visible at any one time can be further extended to note that not all elements of the physical sequence need to be present within the virtual environment at any one time; consequently the binary sequence can be embedded in behavioural elements of the game, such as the relative timing of a repetitive behaviour, either of a single object or sequence of objects. For example, the speed at which doors open within the game can vary by a small amount to encode the binary sequence in an endless loop throughout the game. Similarly a commonly encountered type of enemy may shoot bursts of odd or even numbers of projectiles to encode the binary sequence in an endless loop throughout the game. Other variations in behaviour amenable to this technique will be apparent to the skilled person. Similarly, behaviour of an object may relate to its presence/absence or its activation; hence a flickering or intermittent light source can incorporate identification values into the timing of the flicker, either by using relative timing (or ranges of relative timing) to indicate binary '1' and '0', or more directly by use of Morse code or a similar encoding scheme such as indicating a number by how many times the light flickers within a predetermined period.

As has been implied by the various examples given herein, the encoding of the identification data by the modification of virtual objects placed within the virtual environment is not limited to trees. Rather, the identification data can be encoded by any preselected group of objects within the environment; typically a group will comprise objects of a similar kind such as trees, burning torches, bricks, people, etc., but this is not necessary; for example the cottage in FIGS. 2-4 could also be modified as part of the same sequence including the trees (for example, the position of the door of the cottage can be used to denote a binary value).

However typically it is computationally simpler to embed the identification data within a sequence of virtual objects of a single type because those objects are likely to be generated by a common subroutine, and hence that subroutine can administer the necessary variations to the objects in sequence without reference to other subroutines of the game.

In an embodiment of the present invention a secure authentication system holds the identification data. The identification data itself may be a serial number embedded at manufacture within the game code or some associated data file, or may have been obtained as part of a secure online authentication process, and/or may comprise user specific details such as a network login ID.

Identification data itself may therefore be many bits in length. Preferably the identification data is designed to be a certain number of bits in length that can be easily and discreetly encoded using the above techniques; however where a binary representation of the identification data is longer than a predetermined threshold length (for example because a user's login ID comprises a very long name), then a dimension reduction technique may be used to transform the identification data to a predetermined length of bits.

For example, the binary sequence of the identification data, treated as a vector, can be multiplied by a matrix of predetermined but randomly distributed binary values to generate a new vector having a known length. For example, a predefined 60×20 random matrix can be used to compress a 60 bit binary vector into a 20 bit binary vector.

The uniqueness of the 20 bit binary vector is less than the original 60 bit binary vector, but will still typically be unique enough to uniquely identify one user within a population of users considerably smaller than $2^{20}$. The actual size of the desired binary vector can be a decision for the game designer based upon the anticipated user base.

Clearly, identification data may be only partially processed in this manner; for example a serial number embedded at manufacture and having a fixed bit length may be retained unaltered whilst user login details of variable bit length may be reduced to a binary vector of fixed length by multiplying it with a relevant proportion of a predefined random binary matrix. The two parts can then be concatenated to produce a fixed length binary sequence.

In any event, the secure authentication system holds the identification data and optionally processes some or all of it to fit a predetermined threshold length or to otherwise regularise the bit length.

The secure authentication system then makes the resultant binary sequence corresponding to the identification data accessible to subroutines of the game. The full binary sequence can be placed in memory for the subroutines to access as needed and/or the next bit in the binary sequence may be placed in memory sequentially for subroutines to access on a bit-by-bit basis, although this latter approach requires synchronisation between the secure authentication system and the subroutines.

The secure authentication system can refresh the binary sequence repeatedly to limit the scope for hackers to overwrite the sequence; for example the binary sequence can be refreshed after every video frame generated by the game. Similarly, the location of the binary sequence in memory can be moved with every refresh, requiring a subroutine to obtain the new location from the secure authentication system each time it is needed for a new frame. The secure authentication system may only provide the memory location to trusted subroutines. This would further limit the ability for hackers to overwrite the sequence and thereby remove the visible indication of identification data from the game.

Alternatively or in addition, each trusted subroutine could maintain its own copy of the binary sequence, optionally requesting periodic verification from the secure authentication system; again this would make it difficult for hackers to isolate and replace each instance of the sequence in memory.

In this way identification data may be securely administered centrally, whilst different subroutines can access the binary sequence corresponding to the identification data as needed while assembling the virtual environment for rendering in the current frame.

It will be appreciated that not every subroutine needs to implement the present invention; or where a single subroutine assembles the virtual environment, that it does not need to apply the invention to every object of the virtual environment. In particular there are likely to be objects within the virtual environment whose precise placement and scale are critical, and which should not be modified by the present technique.

Consequently the kinds of objects within the environment that are amenable to the present technique may be associated with a flag indicating that the approach can be used with them, enabling the subroutine to decide whether or not to apply the technique to that kind of object;

optionally where multiple kinds of such objects will be present within the same region of the virtual environment, only one kind may be selected for encoding instead of all of them. For example where a crowd of virtual people are located in a park, it may be that the assignment of gender to individuals in that crowd may be chosen as the means to encode the binary sequence, instead of modifying the trees in the park. Clearly this selection needs to remain consistent whilst the user remains in that region of the virtual environment.

The selection of which flagged objects will be used to encode the binary sequence in any particular region of the virtual environment may be chosen by the game randomly or according to some list or process decided by the game designer; this makes it more difficult for hackers to identify which set of objects in the environment have been varied to embody the code and which may have been varied randomly for aesthetic reasons.

Finally, the positioning of at least some sets of objects may be chosen to make it difficult to omit them from a video clip of the game. Examples include modifying a set of objects within the field of view of the user at a default spawn point; modifying the gender/height/colour distribution of spectators at a finishing line or behind a goal; modifying the type distribution of rubble surrounding a clearing used in a boss battle, placing objects in the background of a cut-scene, and so on.

As a result it will be very difficult for a user to capture video of a game without inadvertently showing some physical feature of the environment that reveals the binary sequence corresponding to the identification data, whether this is in the form of variations in height, type, position, or colour of an object, or variations in behaviour of an object. Moreover, the user cannot easily obscure the sequence (such as one might obscure a visible watermark) without obscuring the majority of the game; thereby making the video pointless and unattractive to watch.

Hence advantageously identification data that makes the user accountable is built into the structure of the virtual environment of the game in a way that cannot be obscured by conventional techniques used to defeat watermarks.

Figure 5:
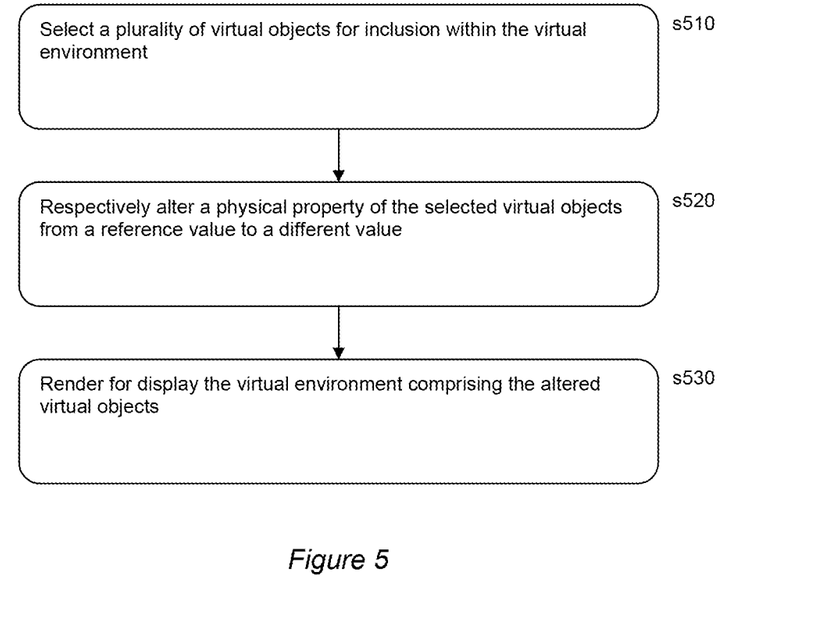
FIG. 5 is a flow diagram of a method of watermarking video images in accordance with embodiments of the present invention.

Referring now to FIG. 5, in a summary embodiment of the present invention, a method of watermarking video images of a particular instance of a virtual environment (1000) (i.e. a particular copy of the program generating that virtual environment) comprises:

in a first step s510, selecting a plurality of virtual objects (1010, 1020) (e.g. 2 or more) for inclusion within the virtual environment;

in a second step s520, respectively altering a physical property of the selected virtual objects (1010, 1020) from a reference value to a respective different value, wherein the respective different value is selected responsive to respective identification values of identification data associated with that particular instance of the virtual environment (1000), and wherein the physical property has a visible effect on the appearance of the virtual objects (1010, 1020); and in a third step s530, rendering for display the virtual environment (1000) comprising the altered virtual objects (1010, 1020).

Advantageously, a would-be pirate cannot easily defeat this watermark using conventional anti-watermark image processing techniques, because the watermark (the identification data) is encoded within physical features of the virtual environment itself. In other words, the identification values are encoded within the composition of the scene in the virtual environment, rather than by use of a traditional watermark that modifies properties of the final rendered image. Removing or obscuring these watermarks requires knowledge of which features of the environment encode the identification data—which can be kept secret and which can also be made to vary between runs of the same instance of the virtual environment, and even if known, would then require digitally editing every video frame (for example to change the heights of trees), which is laborious, and would also typically result in a very poor final video image. The difficulty of identifying all potential representations of the identification data within the environment, the difficulty and time needed to remove or obscure these by image editing, and the impact on the resulting video of the game all make the prospect of unauthorised disclosure unappealing.

In an instance of the summary embodiment, a physical property is scale (e.g. height or width), and a scale of the virtual objects is altered by one selected from the list consisting of:
i. scale values corresponding to identification values; and
ii. scale values selected from within ranges corresponding to identification values.

These allow for easy modification of repeating features in a naturalistic manner.

In an instance of the summary embodiment, a physical property is rotation (e.g. about the x, y, and/or z axis), and a rotation of virtual objects is altered by one selected from the list consisting of:
i. offset values corresponding to identification values; and
ii. offset values selected from within ranges corresponding to identification values (for example within ±N degrees of North, South, East or West, where N is decided by a designer).

In an instance of the summary embodiment, a physical property is placement, and a placement of virtual objects is altered by one selected from the list consisting of:
i. offset values corresponding to identification values; and
ii. offset values selected from within ranges corresponding to identification values.

Again this allows for easy modification of repeating features of the environment. As with variations in scale, the placements can vary by a fixed amount corresponding to the binary values '1' and '0', or they can very within ranges corresponding to these binary values.

In an instance of the summary embodiment, a physical property is placement, and a placement of virtual objects is one selected from the list consisting of:
i. a position within a predetermined region of the virtual environment corresponding to a bit of the identification data; and
ii. a position within a predetermined region of the virtual environment corresponding to co-ordinates in a co-ordinate system other than the co-ordinate system of the virtual environment itself.

As noted previously, the positions of objects within predetermined regions of the virtual environment can directly denote values, such as bits within a bit sequence (as arranged into an N×M array) or numerical values corresponding to co-ordinates within a (1,1)-(N,M) co-ordinate system. It will be appreciated that this co-ordinate system is for the purposes of reading identification data and is typically separate to a more general co-ordinate system used by the virtual world itself. In the binary case, the reading order can be pre-determined. Meanwhile for the co-ordinate case, the reading order can be indicated by a pre-arranged sequence of different objects such as differently dressed people, different animals, etc., at respective co-ordinates.

In an instance of the summary embodiment, a physical property is colour. As noted previously, this is not the same as adding a watermark to a single texture, like adding a watermark to any other image; rather, as explained previously a respective colour change is added to a respective object, and identification data is encoded in the emergent colour sequence corresponding to the object sequence within the environment.

In one case, a colour of virtual objects is altered by applying a tint to a texture of the virtual object.

In an instance of the summary embodiment, a physical property is type of object, and the type of virtual object is altered by one selected from the list consisting of:
i. selecting a respective type allocated to a corresponding identification value; and
ii. selecting a type from a respective set of types allocated to a corresponding identification value.

In an instance of the summary embodiment, the plurality of virtual objects are distributed within a region of the virtual environment in a predetermined order.

Consequently the objects do not need to be in a strict numerical order and for example the second object does not have to be adjacent to the first object, or follow on from the first object in some predetermined direction of travel. As long as the reading order for reading the embedded identification data is known, then the order of the virtual objects within the environment can be arbitrary.

In an instance of the summary embodiment, a physical property is behaviour of an object, and a behaviour of a respective object is altered responsive to a respective identification value.

This approach may be used to encode identification data in mobile or reactive objects (as opposed to trees, rocks etc.); hence for example, referring back to the flock of birds in a roof, data can be encoded in which birds fly off at a given moment in the game. Similarly the direction that people in a crowd turn to face can encode the data (possibly in addition to any prior information values encoded in their initial direction), and as noted previously, repetitive behaviours such as doors opening or lights flickering can be varied to encode data. Another example may be the particular choice of stock phrases (or respective pools of stock phrases) used by certain classes of non-player characters during successive interactions to encode identification values.

In an instance of the summary embodiment, a plurality of virtual objects encoding identification data are placed in a region of the virtual environment that provides the only access between two other regions of the virtual environment.

Many games have save points or regions that overlap between areas of the virtual environment that are being left behind and newly loaded; typically the user must traverse these areas to progress in the game and consequently if objects are placed here then a user cannot avoid capturing the encoded objects in any captured video image.

In a similar vein, in an instance of the summary embodiment, the plurality of virtual objects are placed in a region of the virtual environment facing a position where a user of the virtual environment is initially placed.

Again, this ensures that the identification values, as encoded within structural features of the scene, are visible at least once during game play.

Similarly, some games use in-engine cut scenes (predefined vignettes typically used to further the plot of a game). During these scenes the game has control of the viewpoint within the virtual environment. Consequently objects encoding the identification values can be placed so as to be visible within such a cut scene, so that again a malicious user cannot easily avoid them.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

As noted previously, such hardware may include entertainment devices such as domestic and handheld videogame consoles, smart phones, tablets, laptops and personal computers, as well as other entertainment devices capable of accessing videogames via streaming services, such as mobile phones and smart TVs.

Consequently, in a summary embodiment of the present invention, an entertainment device (such as a PS3®) (10) comprises graphics processing means (100, 200) adapted to generate a virtual environment, the graphics processing means being adapted to select a plurality of virtual objects for inclusion within the virtual environment, and property processing means (100, 200) adapted to respectively alter a physical property of the selected virtual objects from a reference value to a different value. The different value is selected responsive to respective identification values of identification data associated with that particular instance of the virtual environment, and the physical property has a visible effect on the appearance of the virtual objects. The entertainment device also comprises rendering processing means (100, 200) adapted to render for display the virtual environment comprising the altered virtual objects.

In an instance of the summary embodiment, a physical property is one or more selected from the list consisting of:
i. scale;
ii. placement;
iii. rotation;
iv. presence/absence;
v. type;
vi. colour; and
vii. behaviour.

It will be understood that all the method and apparatus embodiments described herein relating to physical embodiments encompass embodiments limited to structural properties only (i.e. scale, placement, rotation, presence/absence, and type, either singly or in combination), excluding colour and behaviour.

Finally, in an instance of the summary embodiment, as described previously herein the entertainment device comprises a secure authentication processing means (100) adapted to securely hold the identification data and provide identification values to the property processing means, optionally by indicating a current memory location of for the values.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of watermarking video images of a particular instance of a virtual environment, comprising the steps of:
   selecting, by at least one processor, a plurality of virtual objects for inclusion within the virtual environment;
   respectively altering, by the at least one processor, a physical property of the selected virtual objects from a reference value to a respective different value,
   wherein the respective different value is selected responsive to a respective identification value of identification data associated with that particular instance of the virtual environment, and
   wherein the physical property has a visible effect on an appearance of the virtual objects; and
   rendering for display, by the at least one processor, the virtual environment comprising the altered virtual objects;
   in which the physical property is type of virtual object, and the type of virtual object is altered by one selected from the list consisting of:
   i. selecting a respective type allocated to a corresponding identification value; and
   ii. selecting a type from a respective set of types allocated to a corresponding identification value.

2. The method according to claim 1, in which a further physical property of the selected virtual objects is scale, and the scale of the virtual objects is altered by one selected from the list consisting of:
   i. scale values corresponding to identification values; and
   ii. scale values selected from within ranges corresponding to identification values.

3. The method according to claim 1, in which a further physical property of the selected virtual objects is rotation, and the rotation of the virtual objects is altered by one selected from the list consisting of:
  i. offset values corresponding to identification values; and
  ii. offset values selected from within ranges corresponding to identification values.

4. The method according to claim 1, in which a further physical property of the selected virtual objects is placement, and the placement of virtual objects is altered by one selected from the list consisting of:
  i. offset values corresponding to identification values; and
  ii. offset values selected from within ranges corresponding to identification values.

5. The method according to claim 1, in which a further physical property of the selected virtual objects is placement, and the placement of virtual objects is one selected from the list consisting of:
  i. a position within a predetermined region of the virtual environment corresponding to a bit of the identification data; and
  ii. a position within a predetermined region of the virtual environment corresponding to co-ordinates in a co-ordinate system other than a co-ordinate system of the virtual environment itself.

6. The method according to claim 1, in which a further physical property of the selected virtual objects is colour.

7. The method according to claim 6, in which the colour of virtual objects is altered by applying a tint to a texture of the virtual object.

8. The method according to claim 1, in which the plurality of virtual objects are distributed within a region of the virtual environment in a predetermined order.

9. The method according to claim 1, in which a further physical property of the selected virtual objects is object behaviour, and the behaviour of a respective one of the plurality of virtual objects is altered responsive to a respective identification value.

10. The method according to claim 1, in which the plurality of virtual objects are placed in a region of the virtual environment that provides the only access between two other regions of the virtual environment.

11. The method according to claim 1, in which the plurality of virtual objects are placed in a region of the virtual environment facing a position where a user of the virtual environment is initially placed.

12. A tangible non-transitory machine-readable medium computer program product comprising a computer readable medium having computer readable program code stored thereon, the program code being adapted to perform, when run on a computer, a method of watermarking video images of a particular instance of a virtual environment, the method comprising:
  selecting a plurality of virtual objects for inclusion within the virtual environment;
  respectively altering a physical property of the selected virtual objects from a reference value to a respective different value,
  wherein the respective different value is selected responsive to a respective identification value of identification data associated with that particular instance of the virtual environment, and
  wherein the physical property has a visible effect on an appearance of the virtual objects; and
  rendering for display the virtual environment comprising the altered virtual objects;
  in which the physical property is type of virtual object, and the type of virtual object is altered by one selected from the list consisting of:
    i. selecting a respective type allocated to a corresponding identification value; and
    ii. selecting a type from a respective set of types allocated to a corresponding identification value.

13. An entertainment device, comprising:
  graphics processing means adapted to generate a virtual environment, the graphics processing means being adapted to select a plurality of virtual objects for inclusion within the virtual environment;
  property processing means adapted to respectively alter a physical property of the selected virtual objects from a reference value to a respective different value,
  wherein the respective different value is selected responsive to a respective identification value of identification data associated with that particular instance of the virtual environment, and
  wherein the physical property has a visible effect on an appearance of the virtual objects; and
  rendering processing means adapted to render for display the virtual environment comprising the altered virtual objects;
  in which the physical property is type of virtual object, and the type of virtual object is altered by one selected from the list consisting of:
    i. selecting a respective type allocated to a corresponding identification value; and
    ii. selecting a type from a respective set of types allocated to a corresponding identification value.

14. The entertainment device according to claim 13, in which a further physical property of the selected virtual objects is one or more selected from the list consisting of:
  i. scale;
  ii. placement;
  iii. rotation;
  iv. presence/absence;
  v. colour; and
  vi. behaviour.

15. The tangible non-transitory machine-readable medium computer program product according to claim 12, in which a further physical property of the selected virtual objects is one or more selected from the list consisting of:
  i. scale;
  ii. placement;
  iii. rotation;
  iv. presence/absence;
  v. colour; and
  vi. behaviour.

* * * * *